United States Patent
Provost (10) Patent No.: US 6,401,572 B1
(45) Date of Patent: Jun. 11, 2002

(54) TORQUE TOOL

(76) Inventor: Dan Provost, 4374 Bridgeview St., Abbotsford, B.C. (CA), V4X 1W8

( * ) Notice: Subject to any disclaimer, the term of this patent is extended or adjusted under 35 U.S.C. 154(b) by 0 days.

(21) Appl. No.: 09/961,810

(22) Filed: Sep. 25, 2001

(30) Foreign Application Priority Data

Jun. 29, 2001 (CA) ............................................. 2351993

(51) Int. Cl.[7] ............................................. B25B 17/00
(52) U.S. Cl. ..................................... 81/57.14; 81/57.31
(58) Field of Search .............................. 81/57.14, 57.3, 81/57.31, 57.42

(56) References Cited

U.S. PATENT DOCUMENTS

| | | | |
|---|---|---|---|
| 4,472,985 A | | 9/1984 | Orikasa |
| 4,535,653 A | * | 8/1985 | Coburn ....................... 81/57.31 |
| 5,269,733 A | * | 12/1993 | Anthony, III ............... 81/57.31 |
| 5,406,866 A | * | 4/1995 | Badiali ........................ 81/57.3 |
| 5,490,439 A | | 2/1996 | Matsumara et al. |
| 5,522,285 A | * | 6/1996 | Wilson, Jr. et al. ......... 81/57.14 |
| 5,616,095 A | * | 4/1997 | Pruitt ......................... 81/57.31 |
| 6,035,746 A | * | 3/2000 | Lin ............................ 81/57.14 |
| 6,165,097 A | | 12/2000 | Hebbale et al. |

* cited by examiner

Primary Examiner—James G. Smith
Assistant Examiner—Hadi Shakeri
(74) Attorney, Agent, or Firm—Frederick Kaufman (57) ABSTRACT

The torque tool comprises a torque converter including three planet carriers which encase three planetary gears. Each of the three planetary gears includes a sun gear and three planet pinions. Each of the three planet carriers has an input disc-shaped plate, directed towards an input shaft of the torque tool and an output disc-shaped plate directed towards an output shaft of the torque tool. The input and output shafts constitute the main shafts of the torque tool. Two of the three planet carriers, which are next to the input shaft, have their output disc-shaped plates extending into sun gears with which they form unitary structures. A stepped pin is centrally disposed in a needle bearing of a first sun gear adjacent the input shaft and extends through sliding bearings located in the following sun gears. A first large diameter of the stepped pin is commensurate with an interior diameter of the needle bearing and a second small diameter of the stepped pin is commensurate with interior equal diameters of the sliding bearings inserted in the following sun gears. The planet pinions of one of the three planet gears, which is adjacent to the output gear, are each provided with a multiplicity of roll needles closely spaced together, the multiplicity of roll needles being inserted between each of the at least three planet gears and an axle for supporting.

6 Claims, 10 Drawing Sheets

TORQUE TOOL

I. BACKGROUND OF THE INVENTION

The present invention relates in general to tightening devices for use in bolt-and-nut fastenings and, more particularly, to a torque tool.

Known prior art torque tools, either of the general category of this invention or having specific features of interest, are found in a great number among the U.S. patents. However, several design problems, which directly influence the reliability and service life of these tools, are not addressed.

It is a first objective of this invention to design sun gears integrally with one of the disc-shaped plates of planet carrier cages, by this preventing misalignment of the main components and reducing the manufacturing costs.

It is a second objective of this invention to enhance the service life of an important subassembly of the torque tool the stepped pin-subassembly, by using, there where the velocity is higher, a larger diameter bearing.

It is the third objective of the present invention: to use roll needles characterized by a high strength and wear resistance, thus allowing the tool to operate normally for a longer period of time.

II. SUMMARY OF THE INVENTION

The torque tool, conform the present invention, comprises a torque converter actuated by a motor. The torque converter includes a housing incorporating internally, with sequentially decreasing diameters, the following: a threaded bore, an annular indentation, an internal spur gear and a smooth bore; and externally, an external spur or a hexagonal zone. The torque converter further comprises a flange for interconnecting the torque converter with the motor. The torque converter incorporates as well a threaded ring for engaging the threaded bore. The threaded ring is mounted with a close-running feet to a cylindrical extension of the flange and with a sliding contact to a flat surface of the flange. The threaded ring is provided with several axially through-holes circumferentially and equidistantly disposed with respect to the axis of the threaded ring. An index plate, located in the annular indentation, comprises a multiplicity of orifices disposed on a circumference equal to that of the several axially through-holes. Several resiliently biased balls are essentially disposed in the through-holes and partially in a corresponding number of orifices of the multiplicity of orifices. Use is made of fasteners for securing the index plate against the flange.

The torque converter further comprises an input shaft assembly incorporating a first sun gear, centrally provided with a blind hole, a first needle bearing inserted with a close-fit in the blind hole and a first bearing for holding the input shaft against the flange. In the torque converter there is a first planet carrier assembly, which includes first and second disc-shaped plates, equally spaced and firmly interconnected. The first disc-shaped plate is provided with a centrally located, axial passage for the first sun gear. The second disc-shaped plate is centrally provided with an outwardly extending second sun gear. The former and the latter form a unitary structure having a central through-opening wherein a first sliding bearing is press-fitted. A first planetary gear is encased in the first planetary carrier. This first planetary gear comprises, besides the first sun gear, three first planet pinions drivingly engaged with the first sun gear and the internal spur gear. The torque converter further comprises a second planet carrier comprising a third and a fourth disc-shaped plates, equally spaced and firmly interconnected. The third disc-shaped plate is provided with a central access opening for the passage of the second sun gear. The fourth disc-shaped plate is provided with an outwardly extending third sun gear, with which it forms a unitary structure having a central through opening into which a second sliding bearing is press-fitted. The second sliding bearing is coaxial with and has an internal diameter equal to the first sliding bearing. The second planetary gear is encased in the second planet carrier and comprises, besides the sun gear, three-second planet pinions drivingly engaged with the second sun gear and internal spur gear. The torque converter incorporates as well a third planet carrier having a fifth and a sixth disc-shaped plate equally spaced and firmly interconnected. The fifth disc-shaped plate, which is directed towards the second planet carrier, is provided with a third central access opening for the passage of the third sun gear. The sixth disc-shaped plate has an outwardly extending hub, successively followed by a fourth sun gear, and a bearing journal. The external diameters of the hub, fourth sun gear and bearing journal diminish consecutively. The sixth disc-shaped plate together with the hub, the first sun gear and the bearing journal constitute a unitary structure. A third sliding bearing is press fitted in a central closed hole located in the sixth disc-shaped plate and the hub. The third sliding bearing is coaxial with and has the same diameter as the second sliding bearing. A third planetary gear is disposed in the third planet carrier and includes, besides the third sun gear, three third planet pinions and, finally, needles to support the third planet pinions on axles. The axles are firmly secured to the fifth and sixth disc-shaped plates. The third planet pinions are drivingly engaged with the third sun gear and the internal spur gear. A stepped pin for preventing misalignment of first, second and third planetary gears is inserted into the first, second and third sliding bearings.

The torque converter further comprises a fourth planet carrier. The latter includes a seventh and an eighth disc-shaped plates, equally spaced and firmly interconnected by attaching elements. The seventh disc-shaped plate is provided with a centrally located cylindrical sleeve. A second bearing is inserted so it has its inner race light-press fitted onto the cylindrical sleeve and its outer race mounted with an interference fit against the internal spur gear. The internal diameter of the cylindrical sleeve is commensurate, with the outwardly extending hub, to allow a free passage of the latter. The eighth disc-shaped plate extends concentrically with a hub of reduced diameter and ends with an output shaft, having a reduced diameter with respect to the concentrical hub. The eighth disc-shaped plate together with the concentrical hub and the output shaft form a unitary structure. A fourth sliding bearing is press fitted in a blind hole formed in the eighth disc-shaped plate and partially in the concentrical hub. The fourth sliding bearing is coaxial with and has the same diameter as the bearing journal. A fourth planetary gear is encased in the fourth planet carrier and includes, besides the fourth sun gear, four fourth planet pinions. A multiplicity of roll needles, which are closely spaced together between each one of the fourth planet pinions and each one of the axles, is inserted. The fourth planet pinions are drivingly engaged with the fourth sun gear and the internal spur gear. Finally, a hub bearing is located between the hub and the smooth bore.

In one aspect of the invention, the stepped pin has a larger diameter corresponding to the internal diameter of the first needle bearing and the small diameter commensurate with the lady internal diameter of the first, second and third sliding bearings. In another aspect of the invention, the multiplicity of roll needles, which are closely spaced together, is inserted between the planet pinions and the axles. The material used for the axles is VascoMax Steel C-350 (trade name). Broadly stating, the torque tool comprises a torque converter which includes:

- at least three planet carriers; and
- at least three planetary gears encased in the three planet carriers; and each of the three planetary gears includes a sun gear and at least three planet pinions. Each of the three planet carriers has an input disc-shaped plate, directed towards an input shaft and an output disc-shaped plate directed towards an output shaft, both input and output shafts being the main shafts of the torque tool. Two of the at least three planet carriers which are next to the input shaft have their output disc-shaped plates extending into sun gears with which they form a unitary structure.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming part hereof, wherein like reference numerals refer to like parts throughout the several views in which:

IV. DESCRIPTION OF THE PREFERRED EMBODIMENTS

Figure 1:
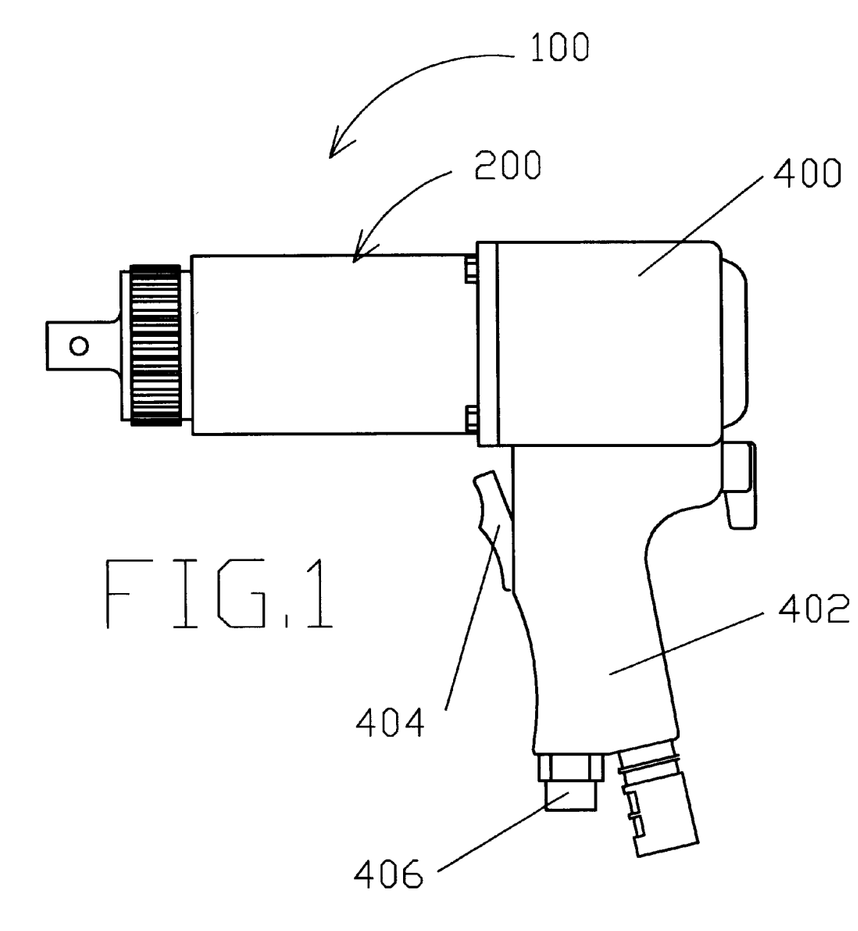
FIG. 1 is the front elevation view of the torque tool.

Referring now to the accompanying drawings and more particularly to FIG. 1 thereof, an embodiment of the torque tool of this invention is generally indicated at 100 and has a torque converter 200 actuated by a motor 400. Torque tool 100 of this invention is conveniently employed, but not exclusively, with a pneumatic motor which, in case of breaking of one or more components, will simply stall. A pressure regulated assembly (not shown) connected between a source of compressed air and pneumatic motor 400 is used.

Pneumatic motor 400 is a hand-held motor of conventional design and is provided with a handle 402, a trigger 404 to activate the motor, and a compressed air connection 406.

Figure 2:
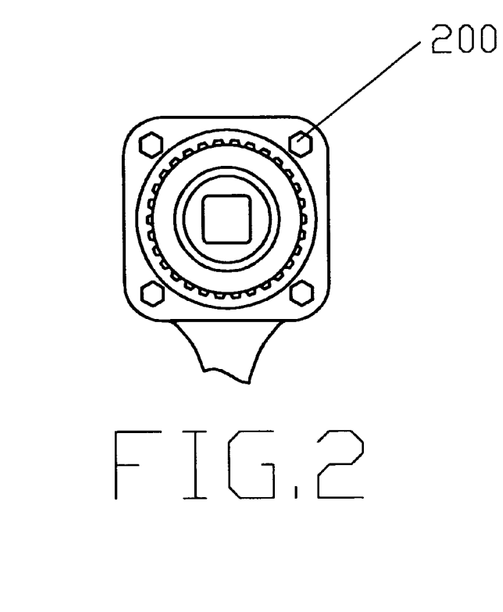
FIG. 2 is the left side view of the torque tool.
Figure 3:
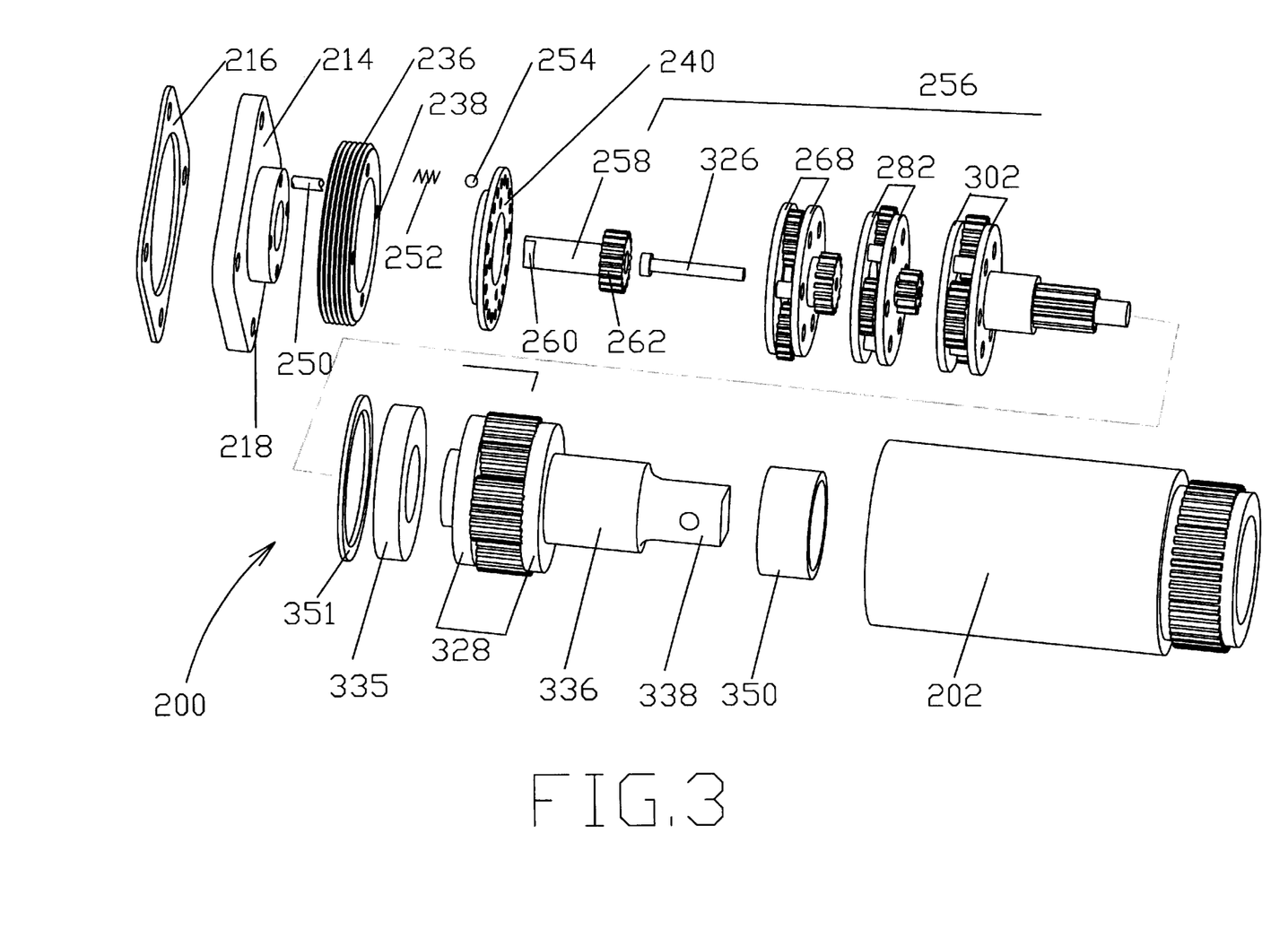
FIG. 3 is the perspective view of the torque converter.

Torque converter 200 is best illustrated in an exploded view in FIG. 2. As shown therein, torque converter 200 comprises a housing 202 of a tubular structure having a threaded bore 204, followed by an annular indentation 205 and then by a spur gear 206 and ending with a smooth bore 208. Threaded bore 204 has a larger diameter than the diameter of the annular indentation 205 and the latter has a diameter larger than the diameter of internal spur 206. The latter has a diameter larger than the diameter of smooth bore 208.

Figure 4:
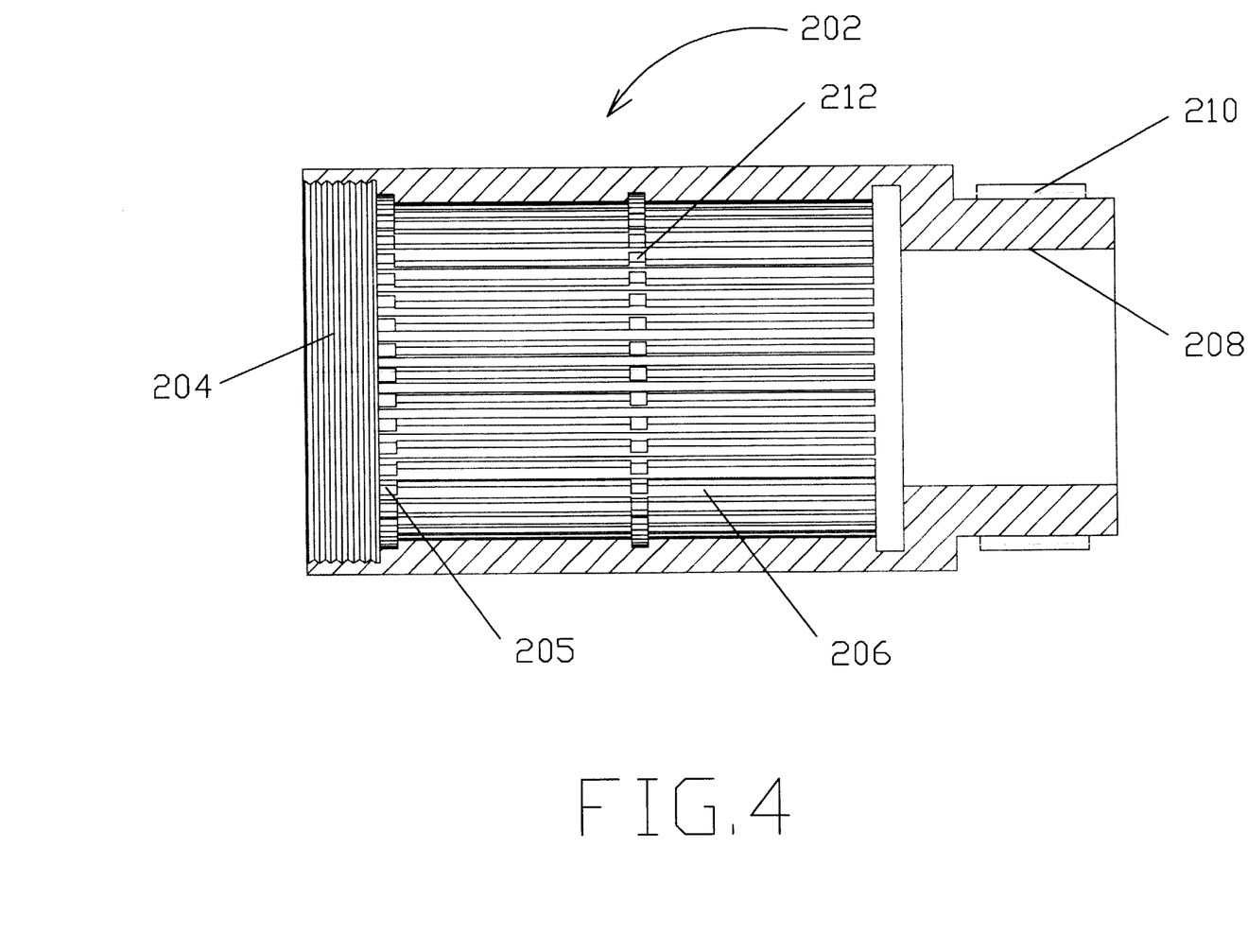
FIG. 4 is a longitudinal cross section of the housing.

Housing 202 comprises as well an external spur gear 210 basically located to correspond with smooth bore 208.

Alternatively, external spur gear 210 may be replaced with a hexagonal zone (not shown).

In internal spur gear 206 a circumferential groove 212 is provided. The latter divides longitudinally internal spur gear 206.

The purpose of threaded bore 204, annular indentation 205, internal spur gear 206 or hexagonal zone will be explained further.

A flange 214 for interconnecting torque converter 200 with pneumatic motor 400 is used and a gasket 216 is interposed between the former and the latter.

Alternatively, when contacting flat surfaces of flange 214 and pneumatic motor 400 are well-finished, no gasket is used.

An alignment protrusion 222 extends outwardly from flange 214 towards pneumatic motor 400 and is inserted into an opening (not shown) of the latter, so as confronting flat surfaces of flange 214 and pneumatic motor 400 are in direct contact.

Figure 5:
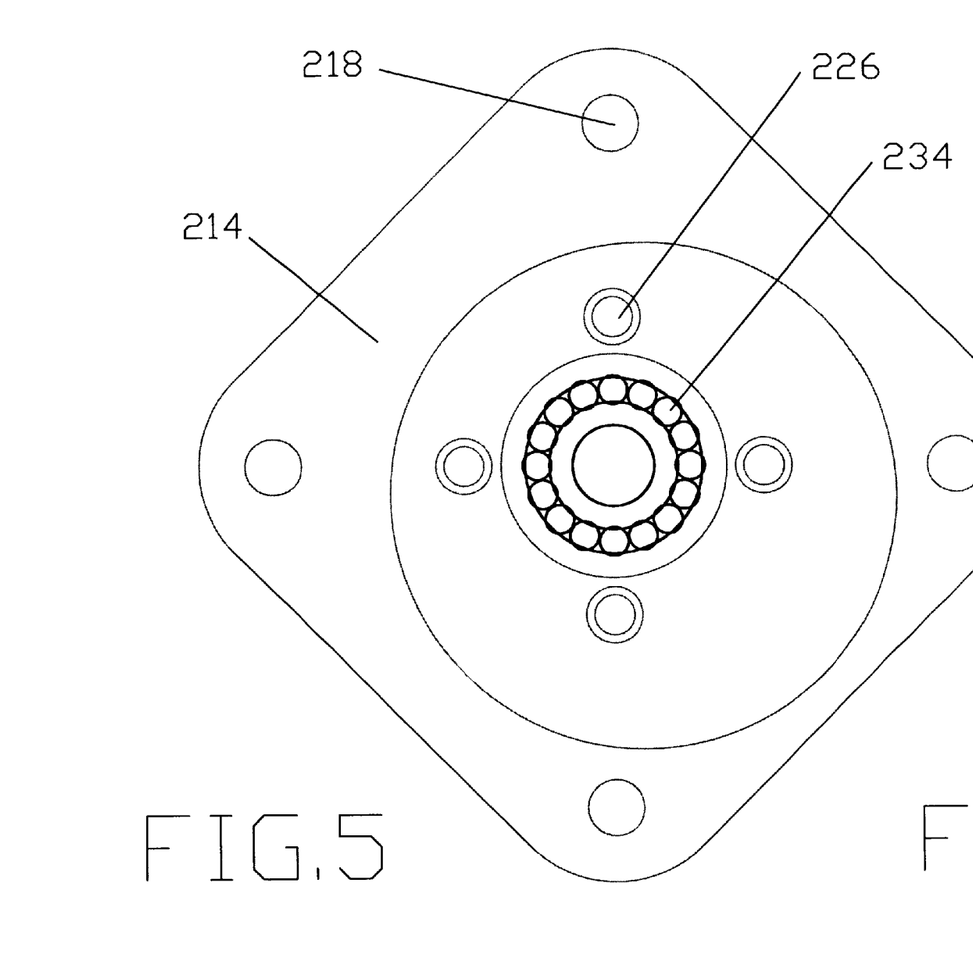
FIG. 5 is a front view of the flange incorporating a bearing.
Figure 6:
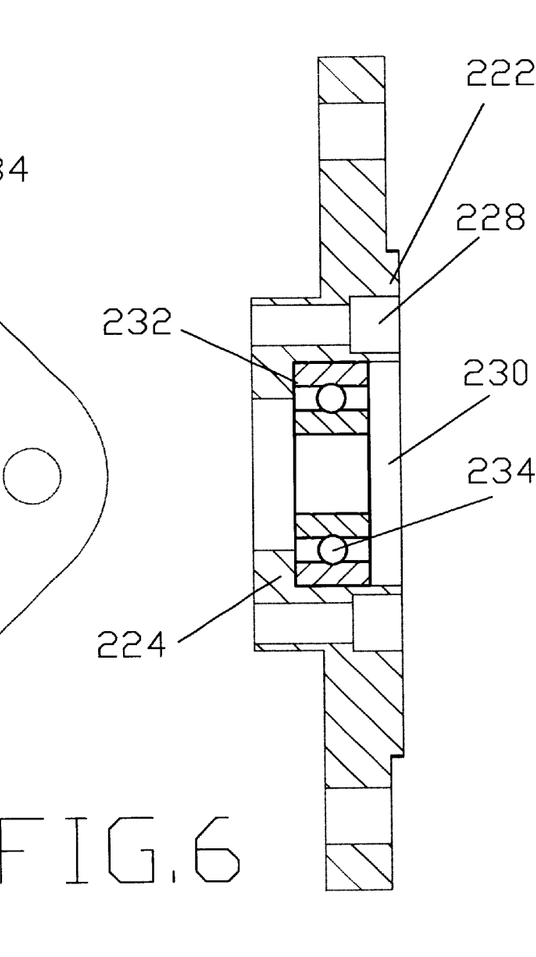
FIG. 6 is a vertical cross section of FIG. 5.

A cylindrical extension 224 projects centrally from flange 214 towards housing 202 and is provided with four equally spaced bores 226. Each bore 226 and with a counterbored hole 228 disposed in alignment protrusion 222. Flange 214 is centrally and entirely traversed, coaxially with cylindrical extension 224, by a stepped cylindrical aperture 230. Thus, an abutment shoulder 232 is formed. A first bearing 234 is held against shoulder 232.

Threaded ring 236 for engaging threaded bore 204 is mounted with a close-running feet on cylindrical extension 224 and with a sliding contact on an adjacent flat surface of flange 214.

Threaded ring 236 is provided with four axially through-holes 238, circumferentially and equidistantly disposed with respect to the axis of threaded ring 236.

Figure 7:
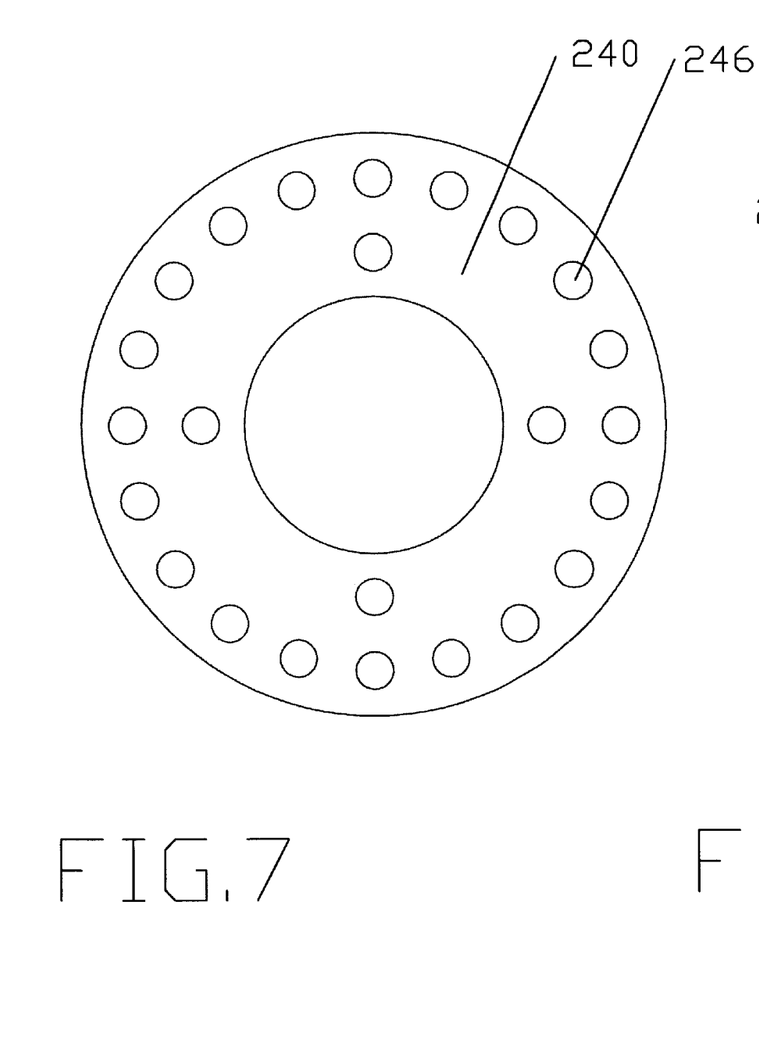
FIG. 7 is the index plate.
Figure 8:
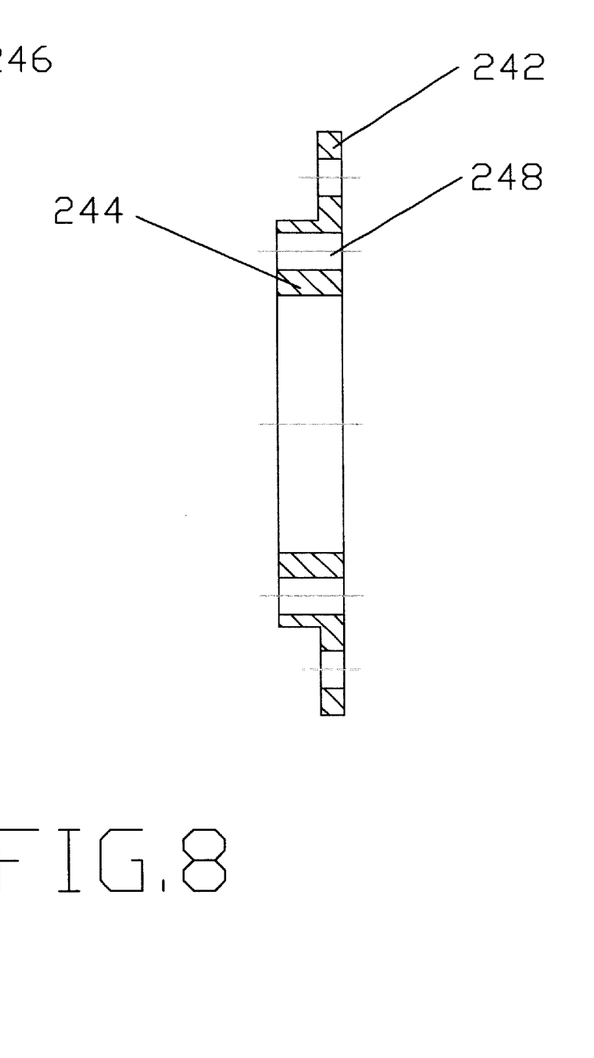
FIG. 8 is a vertical cross section (B—B) of FIG. 7.

An index plate 240 comprises a disc 242 extending coaxially and laterally to a collar 244 of lesser diameter. Disc 242 is provided with a multiplicity of orifices 246 equally spaced apart along and imaginary circle lying in a plan perpendicular to and centered on the longitudinal axis of index plate 240. The imaginary circle, mentioned above, coincides with an imaginary circle along which four through-holes 238 are disposed. Collar 244 is provided with four threaded openings 248 disposed to coincide with four equally spaced bores 226 and impliedly with counterbored holes 228. Fastening elements 250 having their heads located in counterbored holes 226 are used to penetrate threaded opening 248 and firmly secure index plate 240 against flange 214. Index plate 240 is inserted into annular indentation 205 with a close-running fit so that a relative movement between housing 202 and pneumatic motor 400 is possible. In each of four through-holes 238 a compression spring 252 is inserted. Each compression spring 252 acts on a ball 254 simultaneously captivated, partially, in one of the multiplicity of orifices 246 of index plate 240. Should a relative rotation between torque converter 200 and pneumatic motor 400 become necessary in order to achieve a comfortable work position, a torsion moment must be manually applied. Thus, all balls 254 are forced to penetrate completely into through-holes 238 and disengage from orifices 246 of index plate. A sliding of confronting faces of threaded ring 236 and index plate 240 takes place as long th e torsion moment is applied. Then, balls 254 will again be partially captivated simultaneously in through-holes 238 and in four corresponding orifices of multiplicity of orifices 246 and, thus, a relative position housing 202-pneumatic motor 400 is maintained.

Figure 9:
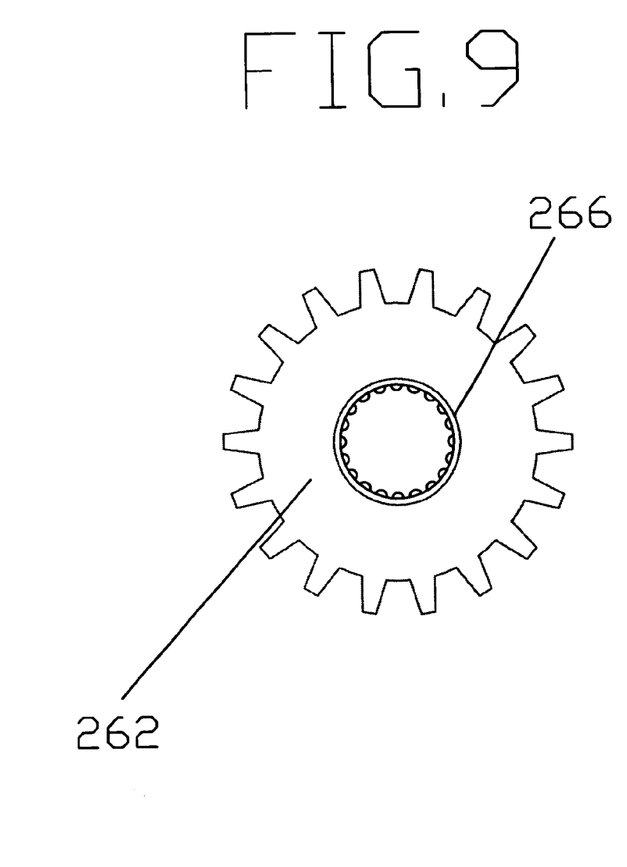
FIG. 9 is the input shaft.
Figure 10:
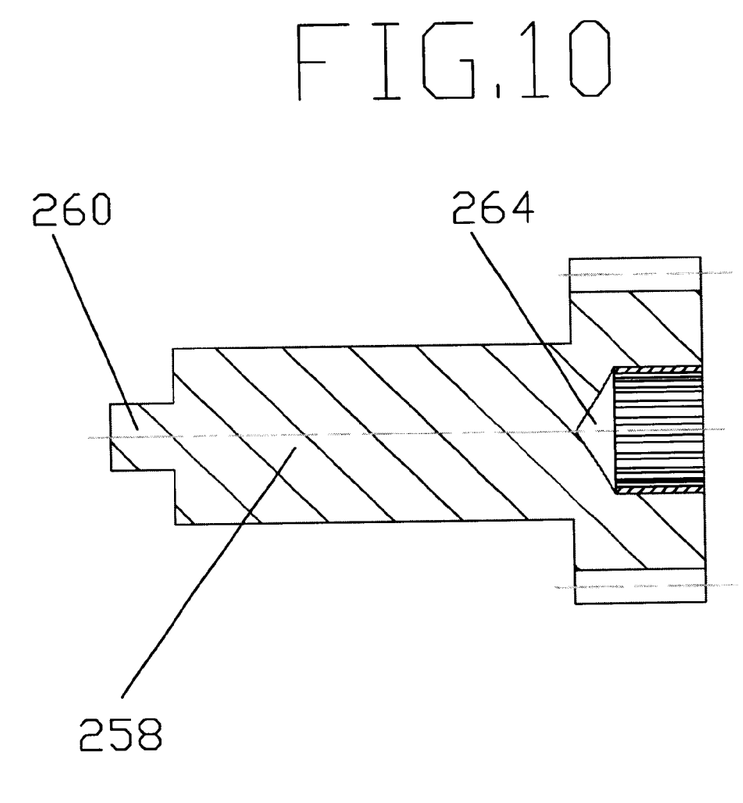
FIG. 10 is a vertical cross section (A—A) of FIG. 9.

Torque converter 200 comprises, besides flange 214, threaded ring 236 and index plate 240, a planetary arrangement 256. The latter comprises, starting from pneumatic motor 400, an input shaft 258 provided at one end with a recess-engaging protrusion 260 and, at the other end, with a first sun gear 262. The latter is centrally provided with a blind hole 264. A first needle bearing 266 is inserted with a close-fit in blind hole 264.

Recess-engaging protrusion 260 is designed for engagement with a complementary recess (not shown) disposed in a rotor (also not shown) of pneumatic motor 400.

First bearing 234 which is held against abutment shoulder 232 is mounted with a close-fit to input shaft 258.

Figure 11:
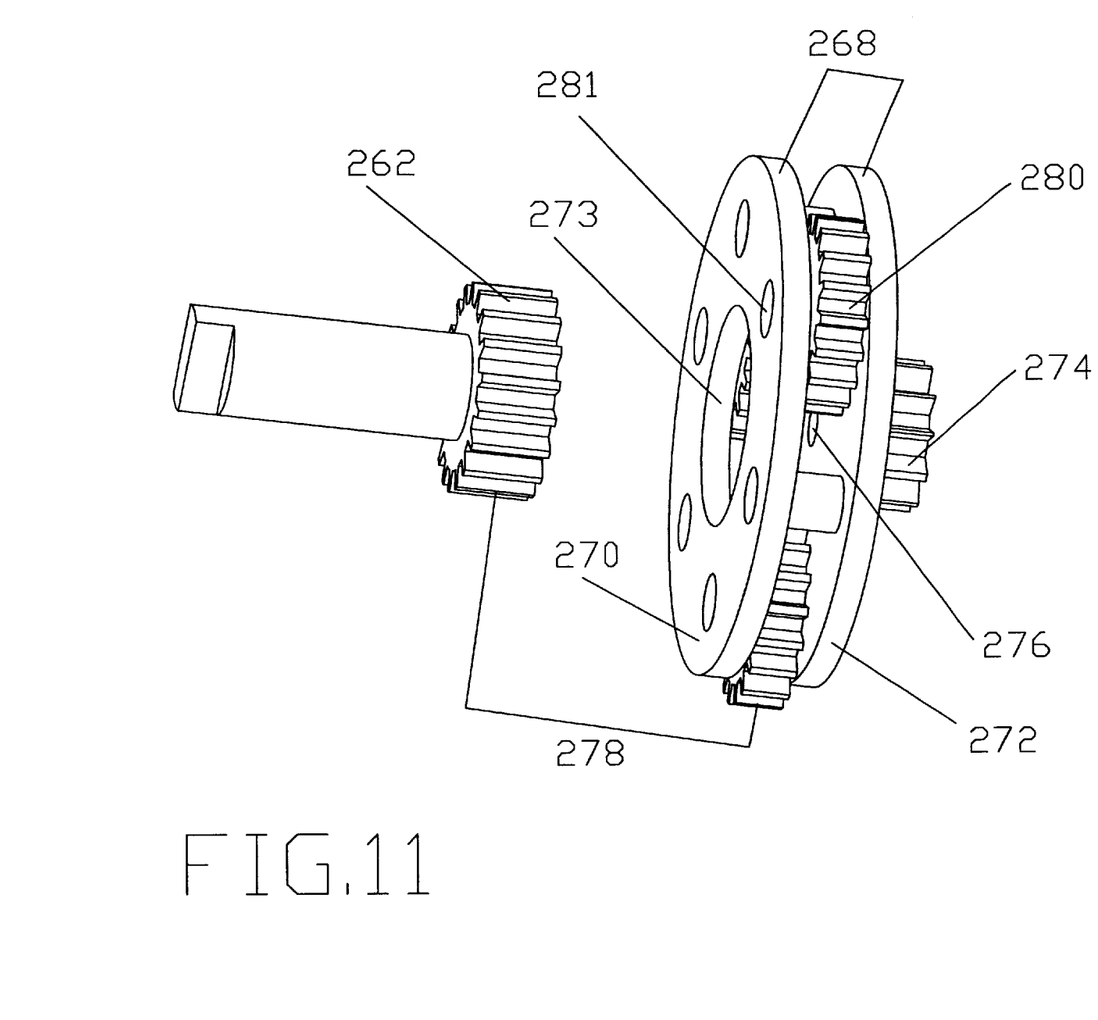
FIG. 11 is a perspective view of the first planet carrier and the first planetary gear.

A first planet carrier cage 268 comprises of first and second disc-shaped plate 270 and 272, respectively, equally spaced and firmly interconnected by suitable features known to those skilled in the art.

First disc-shaped plate 270, which is directed towards pneumatic motor 400, has a first central access opening 246 for the axial passage of first sun gear 262, while second disc-shaped plate 272 is centrally provided with an outwardly extending second sun gear 274. The latter together with second disc-shaped plate 272 form a unitary structure having a central through opening into which a first sliding bearing 276 is press-fitted. The internal diameter of first needle bearing 266 is larger than the internal diameter of first sliding bearing 276, both needle and sliding bearings 266 and 276, respectively, being strictly coaxial.

A first planetary gear 278 disposed in first planet carrier cage 268 includes, besides first sun gear 262, three first planet pinions 280. Axles 281 are firmly and perpendicularly secured to first and second disc-shaped plates 270 and 272, respectively.

Three first planet pinions 280 are equally spaced about 120 degrees apart, along an imaginary circle lying in a plan perpendicular to and centered on the longitudinal axis of first and second sun gears 262 and 274, respectively.

First three planet pinions 280 are drivingly engaged with first sun gear 262 and internal spur gear 206, so they can revolve within the latter and around first sun gear 262, the latter being directly activated by pneumatic motor 400.

Figures 12, 13:
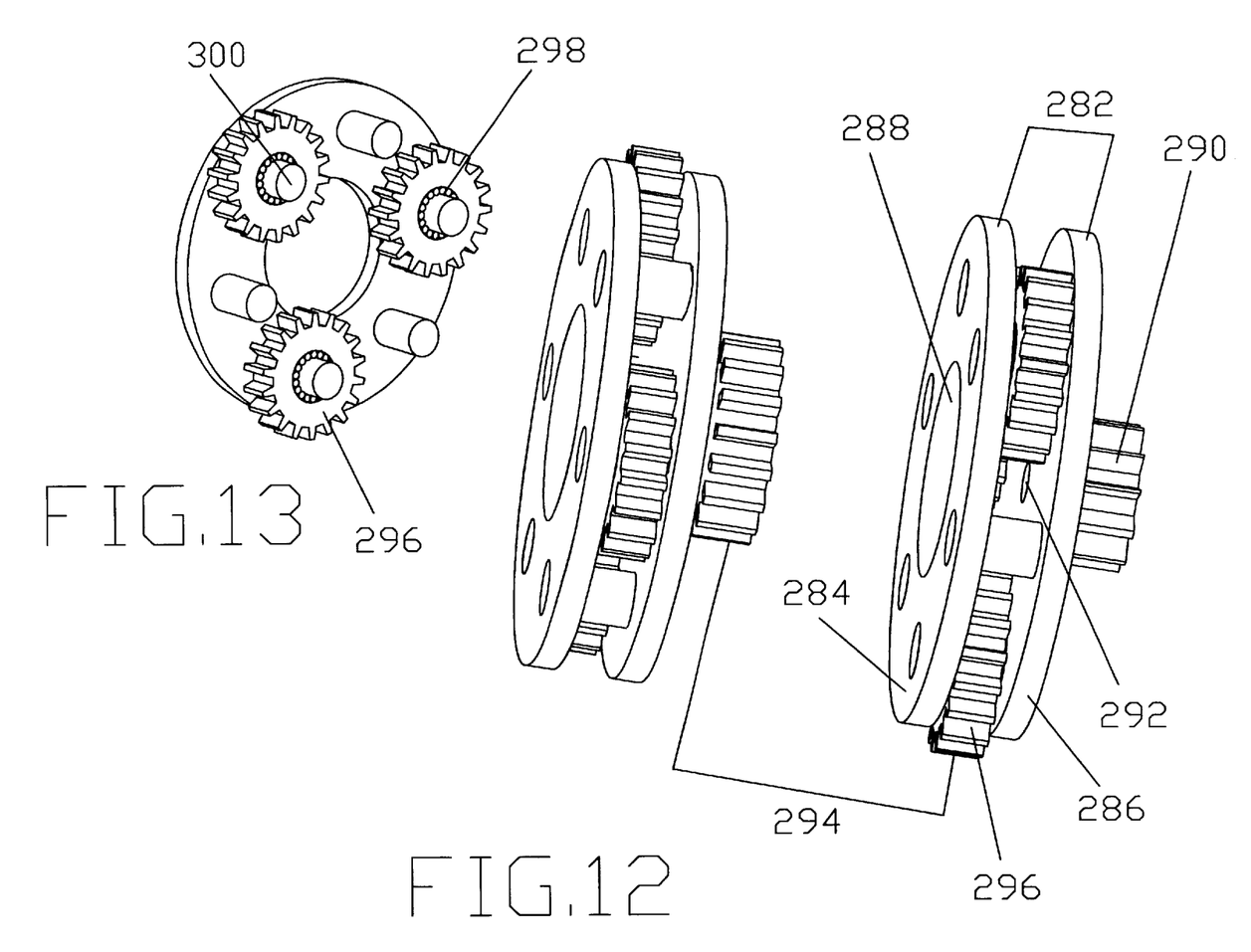
FIG. 12 is a perspective view of the first and second planet carriers and the first and second planetary gears.
FIG. 13 is a perspective view partially showing the second planet carrier and the second planetary gear.

Torque converter 200 further comprises a second planet carrier cage 282 composed of third and fourth disc-shaped plates 284 and 286, respectively. Suitable features, known to those skilled in the art, are used to space and interconnect third and fourth disc-shaped plates 284 and 286.

Third disc-shaped plate 284 which is directed towards first planet carrier cage 268 has a second central access opening 288 for the passage of second sun gear 274, while fourth disc-shaped plate 286 is centrally provided with an extended: third sun gear 290. The latter together with fourth disc-shaped plate 286 form a unitary structure having a central through-opening into which a second sliding bearing 292 is press-fitted. The latter is coaxial with and has the same internal diameter as first sliding bearing 277.

A second planetary gear 294, disposed in the second planet carrier cage 282 includes, besides second sun gear 274, three second planet pinions 296.

Use is made of third needle bearing 298 so that in each second planet pinion 296 a third needle bearing 298 is inserted. Use is also made of second axles 300 to support second planet pinions 296. Second axles 300 are perpendicular and firmly secured to third and fourth disc-shaped plates 284 and 286.

Three second planet pinions 296 are equally spaced about 120 degrees apart, along an imaginary circle lying in a plan perpendicular to and centered on the longitudinal axis of first, second and third sun gears 262, 274 and 290 respectively.

Second planet pinions 296 are drivingly engaged with second sun gear 274 and internal spur gear 206, so they can revolve within the latter and around the former, which is directly activated by first planetary gear 276.

It is obvious, that due to the reduction of speed in second planetary gear 294, in comparison with first planetary gear 276, the torque capacity of second planetary gear 294 is larger than the torque capacity of first planetary gear 276. Consequently, the components of second planetary gear 294 are designed to provide an increased mechanical strength.

Figures 14, 15:
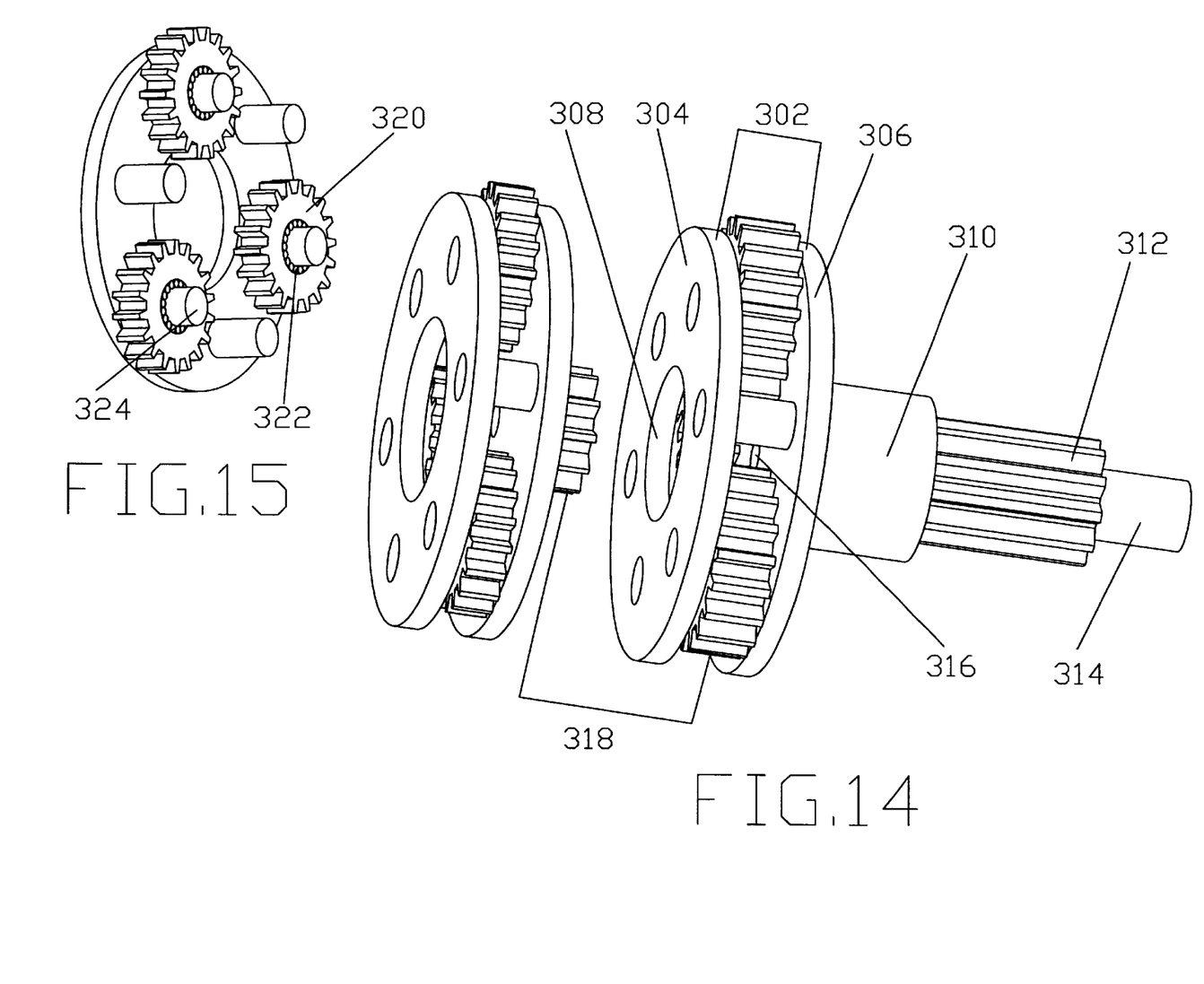
FIG. 14 is a perspective view of the second and third planet carriers and the second and third planetary gears.
FIG. 15 is a perspective view partially showing the third planet carrier and the third planetary gear.

Torque converter 200 further comprises a third planet carrier cage 302 composed of a fifth and sixth disc-shaped plate 304 and 306, respectively. Suitable features, known to those skilled in the art, are used to space and firmly interconnect fifth and sixth disc-shaped plates 304 and 306, respectively.

Fifth disc-shaped plate 304, directed towards second planet carrier cage 282, is provided with a third central axis opening 308 for the passage of third sun gear 290. Sixth disc-shaped 306 is centrally provided with an outwardly extending hub 310, successively followed by a fourth sun gear 312 and a bearing journal 314. External diameters of hub 310, fourth sun gear 312 and bearing journal 314 diminish consecutively. Sixth disc-shaped plate 306 together with hub 310, fourth sun gear 312 and bearing journal 314 constitute a one-piece structure.

Sixth disc-shaped plate 306 and hub 310 have a central closed opening into which a third sliding bearing 316 is press-fitted. The latter is coaxial with and has the same internal diameter as second sliding bearing 292.

A third planetary gear 318 is disposed in third planet carrier cage 302 and includes, besides third sun gear 290, three third planet pinions 320. Use is made of fourth needle bearings 322, so that in each third planet pinion 320 a fourth needle bearing 322 is inserted. Use is made as well of third axles 324 to support planet pinions 320, each of the latter being provided with a fourth needle bearing 322.

Third axles 324 are firmly and perpendicularly secured to fifth and sixth disc shaped plates 304 and 306, respectively.

Alternatively to fourth needle bearings 322, roll needles (not shown), closely spaced together, are inserted between each third planet pinion 320 and its third axle 324. Preferably, third axles are made of VascoMax Steel C-350 (trade name) having a tensile strength of 350 ksi. Three third planet pinions 320 are equally spaced about 120 degrees apart, along an imaginary circle lying in a plan perpendicular to and centered on the longitudinal axis of first, second, third and fourth sun gears 262, 274, 290 and 312, respectively.

Third planet pinions 320 are drivingly engaged with third sun gear 290 and internal spur gear 206, so they can revolve the latter around the former, which is connected to second planetary gear 294.

It is obvious, that due to the reduction of speed accomplished by third planetary gear 318, in comparison with second planetary gear 294, the torque capacity of third planetary gear is larger. Consequently, the components of third planetary gear 318 are designed to provide an increased strength.

A stepped pin 326, inserted in first needle bearing 266 and in first, second and third sliding bearings 277, 292 and 316, respectively. Stepped pin 326 has two diameters: one commensurate with the internal diameter of first needle bearing 266, the other one commensurate with first, second and third sliding bearings 277, 292 and 316, respectively. The purpose of stepped pin 326 is to prevent first, second and third planetary gears 276, 294 and 318, respectively, from misalignment. Having a larger diameter for needle bearing 266, the service life of the latter is clearly enhanced.

Figures 16, 17:
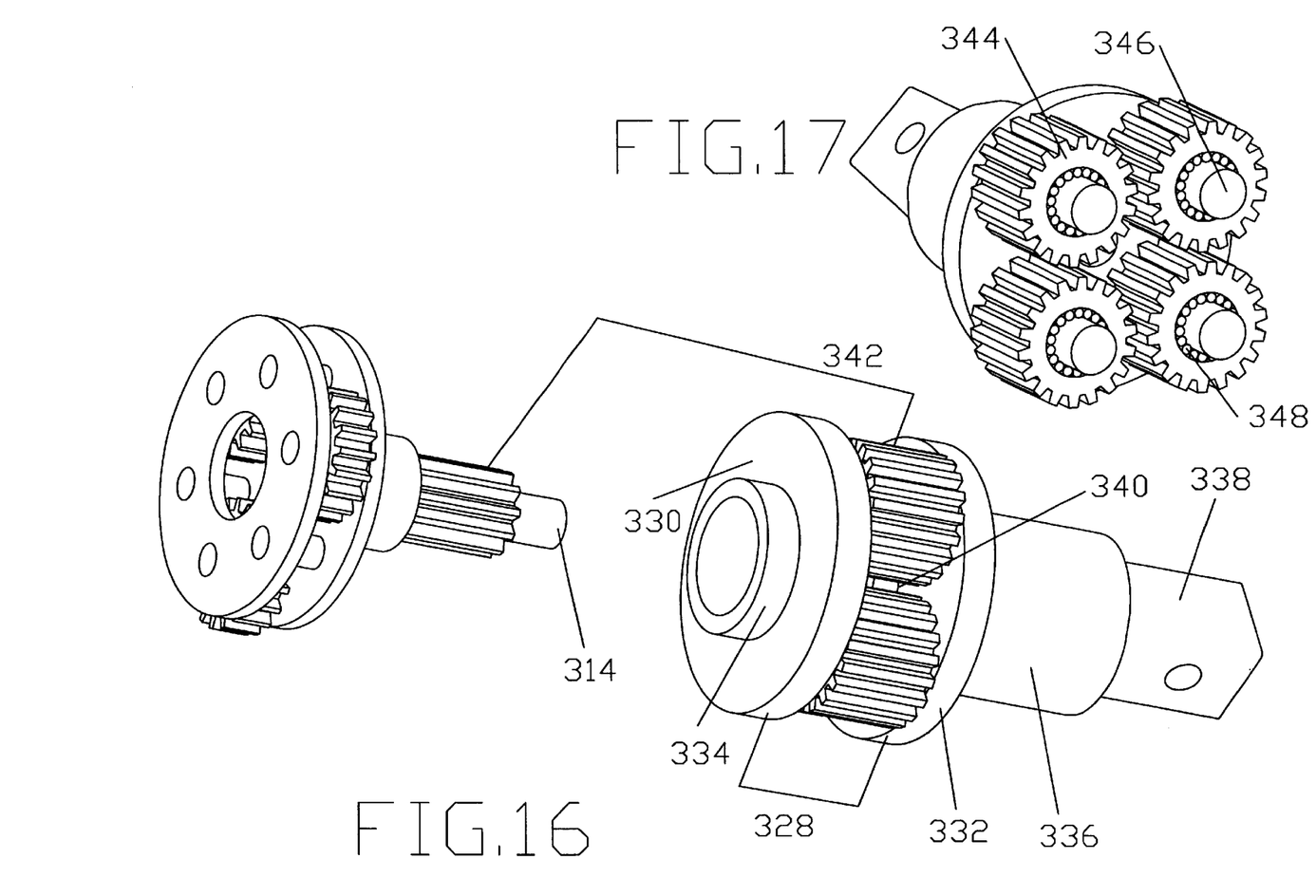
FIG. 16 is a perspective view of the third and fourth planet carriers and the third and fourth planetary gears.
FIG. 17 is a perspective view partially showing the fourth planet carrier and the fourth planetary gear.

Torque converter 200 further comprises a fourth planet carrier cage 328 composed of a seventh and eighth disc-shaped plates 330 and 332, respectively. Suitable features, known to those skilled in the art, are used to space and firmly interconnect seventh and eighth disc-shaped plates 330 and 332. Usually, use is made either of pins or jaws, the latter being adopted to penetrate into complementary recesses for jaws.

Seventh disc-shaped plate 330, which is directed towards third planet carrier cage 302, has a centrally located cylindrical sleeve 334.

A second bearing 336 has its inner race fitted onto hub 310 and its outer race pressed against internal spur gear 206.

Internal diameter of cylindrical sleeve 334 assures a free passage of outwardly extending hub 310.

Eight disc-shaped plate extends into a concentrical hub 336 of reduced diameter and with an outward shaft 338. The latter may drive a nut socket or other similar features (not shown).

Eight disc-shaped plates 332 together with concentrical hub 336 and outward shaft 338 form a one-piece structure. Alternatively, outward shaft 338 can be an elongated, detachable part.

A fourth sliding bearing 340 is press-fitted in a blind hole provided in eight disc-shaped plate 332 in partially in concentrical hub 336. Fourth sliding bearing 340 is coaxial with and has the same diameter as bearing journal 314.

A fourth planetary gear 342 is disposed in fourth planet carrier cage 328 and includes, besides fourth sun gear 312, four fourth planet pinions 344.

Use is made of four axles 346 to support four fourth planet pinions 344. Fourth axles 346 are firmly and perpendicularly secured to seventh and eighth disc-shaped plates 330 and 332. Between each one of fourth planet pinions 344 and each axle 346, a multiplicity of roll needles 348, closely spaced together, is inserted. Fourth axles 346 are made of Vasco-Max Steel C-350 (trade name).

Four fourth planet pinions 344 are equally spaced apart, along an imaginary circle lying in a plan perpendicular to and centered on the longitudinal axis of fourth sun gear 312.

Fourth planet pinions 344 are drivingly engaged with fourth sun gear 312 and internal spur gear 206, so they can revolve within the latter and around the former, which is connected to third planetary gear 318. It is obvious, that due to the reduction of speed accomplished by fourth planetary gear 342 in comparison with third planetary 318, the torque capacity of fourth planetary gear 342 is consequently larger. Accordingly, the components of fourth planetary gear 342 are designed to provide a relatively increased strength.

A fifth needle bearing 350 is mounted between outwardly extending hub 310 and smooth bore 208.

Alternatively to fifth needle bearing 350, other types of ball or roll bearings can be used. A springy retainer ring 351 is inserted circumferentially into groove 212 for separating second bearing 336 from sixth disc-shaped plate 306 of third planet carrier cage 302. The purpose of springy retainer ring 351 is to transmit the resulting impact, when torque tool 100 is accidentally dropped, to housing 202 instead of third, second, and first planetary gears 318, 294 and 276, respectively.

As required, detailed embodiments of the present invention are disclosed, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

What is claim is:

1. Torque tool comprising
   a torque converter actuated by
   a motor;
      said torque converter including
         a housing means comprising, with sequentially decreasing internal diameters, the following four features:
            a threaded bore;
            an annular indentation;
            an internal spur gear; and
            a smooth bore; and then
            an external spur, located to correspond essentially to said smooth bore;
         a flange for coaxially interconnecting said torque converter with said motor;
         a threaded ring for engaging said threaded bore, mounted with a close-running fit to a cylindrical extension of said flange and with a sliding contact to a flat surface of said flange, said threaded ring being provided with several axial through-holes, circumferentially and equidistantly disposed with respect to a central axis of said threaded ring;
         an index plate located in said annular indentation and provided with a multiplicity of orifices disposed on a circumference equal to that of said several axial through-holes;
         resiliently biased balls essentially disposed in said several axial through holes and in corresponding orifices of said multiplicity of orifices;
         fasteners for securing said index plate against said flange;
      said torque converter further including
         an input shaft incorporating
         a first sun gear centrally provided with a blind hole;
         a first needle bearing inserted with a close-fit in said blind hole;

a first bearing for holding for said input shaft against said flange;
a first planet carrier comprising
first and second disc-shaped plates, equally spaced and firmly interconnected;
said first disc-shaped plate being provided with a centrally located axial passage for said first sun gear;
said second disc-shaped plate being centrally provided with an outwardly extending second sun gear, said second disc-shaped plate and said second sun gear forming a unitary structure having a central through-opening into which a first sliding bearing is press-fitted;
first planetary gear located in said first planet carrier and comprising, besides said first sun gear, three first planet pinions drivingly engaged with said first sun gear and said internal spur gear;
said torque converter means further comprising
a second planet carrier including
a third and fourth disc-shaped plates, equally spaced and firmly interconnected; said third disc-shaped plate being provided with a second central axis opening for the passage of said second sun gear; said fourth disc-shaped plate being centrally provided with an outwardly extending third sun gear; said fourth disc-shaped plate and said third sun gear forming a unitary structure having a central through-opening into which a second sliding bearing is press-fitted, the latter having an equal diameter with said first sliding bearing, said central through-opening and said: second sliding bearing being coaxial;
a second planetary gear encased in said second planet carrier and comprising, besides said second sun gear, three second planet pinions drivingly engaged with said second sun gear and said internal spur;
said torque converter further comprising
a third planet carrier including;
fifth and a sixth disc-shaped plates equally spaced and firmly interconnected;
said fifth disc-shaped plate, directed towards second planet carriers, being provided with a third central access opening for the passage of said third sun gear; said sixth disc-shaped plate being centrally provided with an outwardly extending hub, successively followed by a fourth sun gear and a bearing journal, external diameters of said outwardly extending hub, said fourth sun gear and said bearing journal diminishing consecutively; said sixth disc-shaped plate together with said outwardly extending hub, said fourth sun gear and said bearing journal constituting a unitary structure;
a third sliding bearing press-fitted in a central closed opening disposed in said sixth disc-shaped plate and in said outwardly extending hub, said third sliding bearing being coaxial with and having the same diameter as said second sliding bearing;:
a third planetary gear disposed in said third planet carrier and including, besides said third sun gear; three third planet pinions and
needle bearings for supporting said three third planet pinions on axles, the latter being perpendicularly secured to said fifth and sixth disc-shaped plates, said third planet pinions being drivingly engaged with said third sun gear and said internal spur gear;
a stepped pin inserted in said first needle bearing and in said first, second and third sliding bearings;
said torque converter means further comprising:
a fourth planet carrier incorporating
seventh and eighth disc-shaped plates equally spaced and firmly interconnected by attaching elements; said seventh disc-shaped plate being provided with a centrally located cylindrical sleeve;
a second bearing having an inner and an outer race, said inner race being light-press fitted onto said cylindrical sleeve, and said outer race being mounted with an interference fit against said internal spur gear, an internal diameter of said cylindrical sleeve being commensurate with said outwardly extending hub to assure a free passage of the latter; said eight disc-shaped plate extending into a concentrical hub of reduced diameter and ending with an output shaft having a reduced diameter with respect to said concentrical hub; said eight disc-shaped plate together with said concentrical hub and said output shaft forming a one-piece structure;
a fourth sliding bearing press fitted in a blind hole formed in said eighth disc-shaped plate and partially in said concentrical hub, said fourth sliding bearing being coaxial with and having the same diameter as said bearing journal;
a fourth planetary gear, disposed in said fourth planet carrier and including, besides said fourth sun gears, :four fourth planet pinions and axles to support said fourth planet pinions;
a multiplicity of roll needles, closely spaced together and disposed between each one of said fourth planet pinions and each one of said axles to support said fourth planet pinions, the latter being drivingly engaged with said fourth sun gear and said internal spur gear; and
a hub bearing disposed between said concentrical hub and said smooth bore.

2. Torque tool as defined in claim wherein said stepped pin has a large diameter commensurate with an internal diameter of said first needle bearing and a small diameter commensurate with an internal diameter of first, second and third sliding bearings.

3. Torque tool as defined in either one of claims 1, or 2, wherein in said multiplicity of roll needles, said roll needles are closely spaced together and inserted between each one of said fourth planet pinions and said axles to support said fourth planet pinions, said axles to support said fourth planet pinions being made of VascoMax Steel C-350 (tradename).

4. Torque tool comprising torque converter means including
at least three planet carriers;
at least three planetary gears encased in said at lease three planet carriers; each of said at least three planetary gears including a sun gear and at least three planet pinions;
each of said at least three planet carriers having an input disc-shaped plate, directed towards an input shaft of said torque tool and an output disc-shaped plate directed towards an output shaft of said torque tool;

said input and output shafts forming main shafts of said torque tool; wherein two of said at least three planet carriers, next to said input shaft, have each their output disc-shaped plate provided with said sun gear with which it forms a one- piece structure.

5. Torque tool, as defined in claim 10, further comprising a stepped pin inserted into a needle bearing centrally disposed in said sun gear adjacent said input shaft and extending trough sliding bearings located in said sun gears' of said two of said at least three planet carriers, a first large diameter of said stepped pin being commensurate with an interior diameter of said needle bearing and a second small diameter of said stepped pin means being commensurate with interior equal diameters of said sliding bearings located in said sun gears of said two of said at least three planet carriers.

6. Torque tool as defined in either one of claims 4, or 5, wherein said at least three planet pinions of one of said at least three planetary gears, which is adjacent to said output shaft, is each provided with a multiplicity of roll needles closely spaced together, said multiplicity of roll needles being inserted between each of said at least three planet pinions and an axle for supporting each of the latter.

* * * * *